US011030726B1

(12) United States Patent
Minor (10) Patent No.: US 11,030,726 B1
(45) Date of Patent: Jun. 8, 2021

(54) IMAGE CROPPING WITH LOSSLESS RESOLUTION FOR GENERATING ENHANCED IMAGE DATABASES

(71) Applicant: SHUTTERSTOCK, INC., New York, NY (US)

(72) Inventor: Bryan Michael Minor, New York, NY (US)

(73) Assignee: Shutterstock, Inc., New York, NY (US)

( * ) Notice: Subject to any disclaimer, the term of this patent is extended or adjusted under 35 U.S.C. 154(b) by 77 days.

(21) Appl. No.: 16/394,147

(22) Filed: Apr. 25, 2019

(51) Int. Cl.
| G06T 3/40 | (2006.01) |
| G06T 5/00 | (2006.01) |
| G06K 9/62 | (2006.01) |
| G06F 16/51 | (2019.01) |

(52) U.S. Cl.
CPC ............... G06T 5/003 (2013.01); G06F 16/51 (2019.01); G06K 9/6215 (2013.01); G06K 9/6256 (2013.01); G06T 3/4023 (2013.01); G06T 2207/20084 (2013.01)

(58) Field of Classification Search
CPC .................. G06T 5/003; G06T 3/4023; G06T 2207/20084; G06K 9/6256; G06K 9/6215; G06F 16/51
USPC ....... 382/156, 254, 274, 276, 293, 298, 128, 382/131; 348/36, 61, 143, 335, 207.99, 348/E5.03, E7.087, E7.091, E5.055, 348/E5.091
See application file for complete search history.

(56) References Cited

U.S. PATENT DOCUMENTS

| 5,740,267 | A | * | 4/1998 | Echerer | G06T 5/009 |
| | | | | | 382/132 |
| 7,269,303 | B2 | * | 9/2007 | Miller | H04N 1/00209 |
| | | | | | 382/254 |
| 7,990,429 | B2 | * | 8/2011 | Saito | H04N 5/23212 |
| | | | | | 348/222.1 |
| 8,724,919 | B2 | * | 5/2014 | Pillman | G06T 5/003 |
| | | | | | 382/254 |
| 2003/0043394 | A1 | * | 3/2003 | Kuwata | H04N 1/628 |
| | | | | | 358/1.9 |
| 2014/0086486 | A1 | * | 3/2014 | Pillman | G06T 5/003 |
| | | | | | 382/173 |
| 2019/0304099 | A1 | * | 10/2019 | Hever | G06K 9/6271 |
| 2020/0118282 | A1 | * | 4/2020 | Patriarche | G06T 7/12 |
| 2020/0286208 | A1 | * | 9/2020 | Halupka | G06N 3/088 |
| 2020/0320341 | A1 | * | 10/2020 | Khurana | G06K 9/00302 |

* cited by examiner

*Primary Examiner* — Sheela C Chawan
(74) *Attorney, Agent, or Firm* — McDermott Will & Emery LLP (57) ABSTRACT

A method including selecting, in a server, a first image portion from an image is provided. The method also includes identifying one or more known similar images associated with the first image portion, and determining a first score for enhancing the first image portion based on the known similar image(s). The method includes increasing a pixel resolution in the first image portion according to the scale to form an enhanced image portion. The method also includes identifying a synthetic value for the enhanced image portion and storing the enhanced image portion in a database when the synthetic value is below a tolerance value.

14 Claims, 8 Drawing Sheets

IMAGE CROPPING WITH LOSSLESS RESOLUTION FOR GENERATING ENHANCED IMAGE DATABASES

BACKGROUND

Field

The present disclosure generally relates to enhancing the quality of a database by suitably modifying existing images in the database. More specifically, the present disclosure relates to identifying image crops from existing images in a database as candidates for lossless resolution enhancement, and storing the lossless enhanced image crops as new resources in the database.

Description of the Related Art

Current image databases have the limitation of the resolution of devices used to collect each of the images and the compression algorithms used for storage and processing. Typically, this limitation results in a heterogeneous quality of the stored images, and a limited thematic resource and versatility.

SUMMARY

In one embodiment of the present disclosure, a computer-implemented method is described, including selecting, in a server, a first image portion from an image. The computer-implemented method also includes identifying a known similar image associated with the first image portion, and determining a first score for enhancing the first image portion based on the known similar image. The computer-implemented method includes increasing a pixel resolution in the first image portion according to the scale to form an enhanced image portion. The computer-implemented method also includes identifying a synthetic value for the enhanced image portion and storing the enhanced image portion in a database when the synthetic value is below a tolerance value.

In one embodiment of the present disclosure, a computer-implemented method is described that includes selecting multiple images in a training set and selecting, for each of the images, an image portion. The computer-implemented method also includes determining a score for each image portion based on a known similar image and a test coefficient and modifying the image portion to obtain an enhanced image portion with an increased pixel resolution when the score is higher than a pre-selected value. The computer-implemented method also includes identifying a quality value of the enhanced image portion and modifying the test coefficient when the quality value is less than a tolerance value.

According to one embodiment, a system is described that includes one or more processors and a memory coupled to the one or more processors, the memory including instructions that, when executed by the one or more processors, cause the one or more processors to select, in a server, a first image portion from an image. The one or more processors also execute instructions to identify a known similar image to the first image portion, and to determine a first score for enhancing the first image portion based on the known similar image. The one or more processors execute instructions to increase a pixel resolution in the first image portion according to the scale to form an enhanced image portion. The one or more processors also execute instructions to identify a synthetic value for the enhanced image portion, and to store the enhanced image portion in a database when the synthetic value is below a tolerance value.

According to one embodiment, a non-transitory, machine-readable medium is described that includes instructions, which when executed by one or more processors, cause a computer to perform a method for executing the commands causing the system to perform a method that includes selecting, in a server, a first image portion from an image and identifying a known similar image associated with the first image portion. The method also includes determining a first score for enhancing the first image portion based on the known similar image. The method also includes increasing a pixel resolution in the first image portion according to the scale to form an enhanced image portion, identifying a synthetic value for the enhanced image portion, and storing the enhanced image portion in a database when the synthetic value is below a tolerance value.

In yet other embodiment, a system is described that includes a means for storing commands and a means for executing the commands causing the system to perform a method that includes selecting, in a server, a first image portion from an image and identifying a known similar image associated with the first image portion. The method also includes determining a first score for enhancing the first image portion based on the known similar image. The method includes increasing a pixel resolution in the first image portion according to the scale to form an enhanced image portion, identifying a synthetic value for the enhanced image portion, and storing the enhanced image portion in a database when the synthetic value is below a tolerance value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a search query associated with an image for identifying the image.

The present disclosure relates to the selective use of cropping functions with resolution enhancement tools to obtain high quality images from an existing database, and thus increase the resources of the database by storing the enhanced cropped images as new image resources. Currently, it is possible to identify certain features (e.g., people, cars) in images. However, image recognition algorithms typically lack the ability to select crops from an image and enhance the selection to create new, marketable images (e.g., images that can be stored in a database and downloaded by multiple users). Embodiments as disclosed herein resolve the above technical problem by providing a learning model that has the ability to compare among different candidate image portions (or "crops"). The learning model uses performance data for the image enhancement of different crops to select the crops that render better, or the best results. In some embodiments, the learning model makes a fully automated selection of candidate crops, over multiple cropping scale ranges.

Given an image, the learning model identifies appropriate crops regions using a similar image type selected from the database. The image portion resulting from image cropping has a reduced resolution, typically below quality standards. To resolve this problem, some embodiments re-scale the image crops to obtain a desired resolution using a Generative Adversarial Network (GAN) tool. This process allows the automatic identification of a better image crop produced at a desired higher resolution. Some implementations provide a front-end portal that users can access remotely using a mobile device or a workstation. Through the front-end portal, a user can select a specific image crop by hand, and test whether an enhanced image portion produces an image that the user desires to download, or apply in a graphic design.

Embodiments as disclosed herein provide a solution to the problem arising in the realm of computer technology of generating and updating image databases for search engines and graphic editors. The solution relies on fully automated identification of optimal image crops for the generation of new images. To optimize the identification process, some embodiments use image enhancement engines based on similar image comparisons and appropriately weighting the performance of multiple results for selecting the better results. In some embodiments, the criteria for selecting suitable image crops are flexible. In some embodiments, a selection criterion includes a predicted performance of new image crops based on the interest that the enhanced image crop may generate. The interest may be measured as downloads, clicks, or sales of the enhanced image crop and closely related images. Some embodiments include a feedback loop for the learning model to allow further improvements from previous predictions. Selected candidate image crops are processed (e.g., using a GAN tool) to improve resolution to desired resolution. Performance of these new images is monitored to modify and adjust the learning model with new predictions for image quality.

The proposed solution further provides improvements to the functioning of the computer itself, because it creates an expanded resource of images for an image search engine. The availability of an almost endless image resource also reduces the computational cost of a search engine, and provides a tool for equalization of image quality across the database.

Example System Architecture

Figure 1:
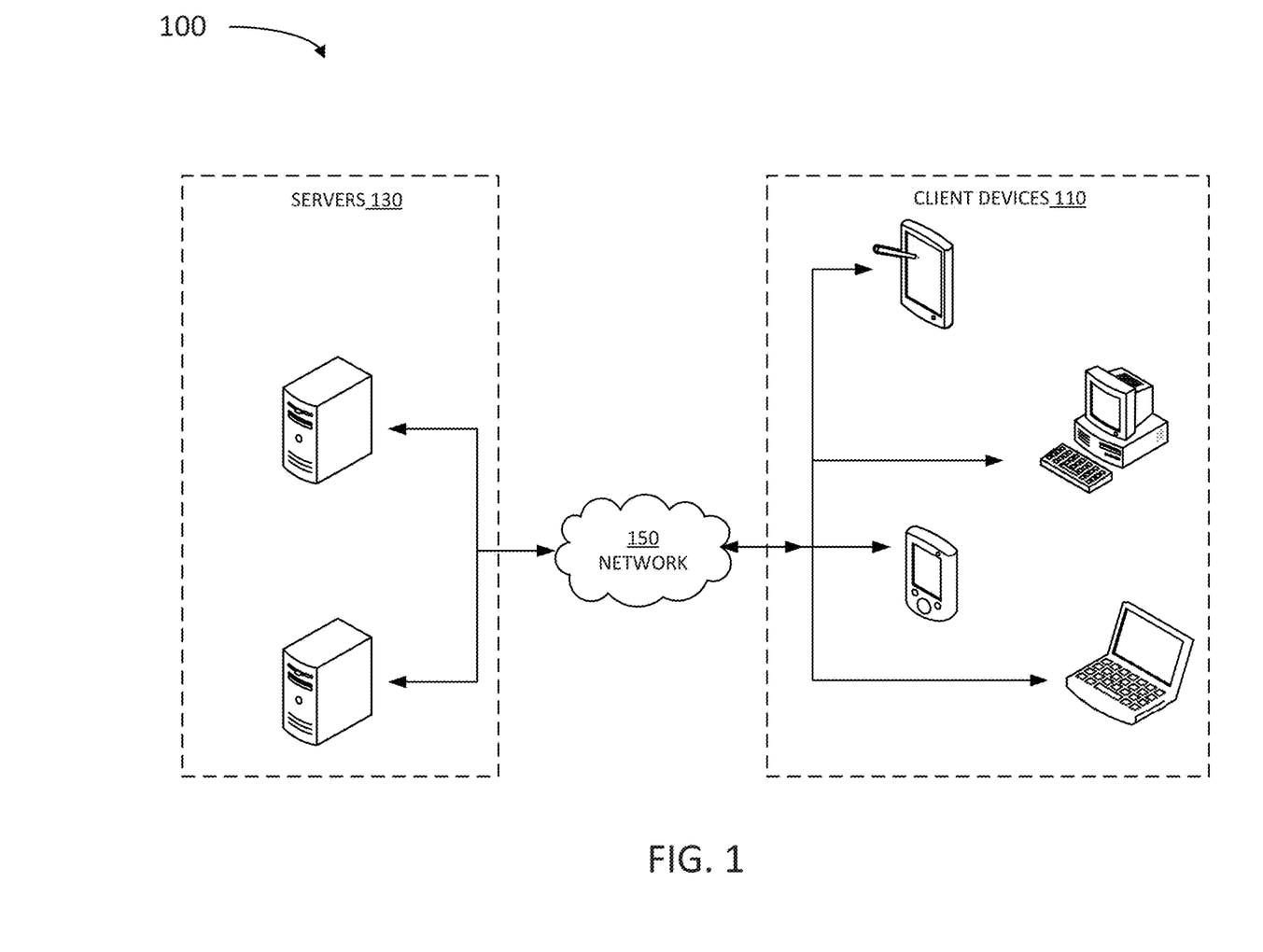
FIG. 1 illustrates an example architecture suitable for updating an image crop, according to some embodiments.

FIG. 1 illustrates an example architecture 100 for an image search engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to identify one or more image portions that may be automatically converted in separate, enhanced images for use in a database. The processor may use a suitably trained image enhancement engine, including a GAN tool. The GAN tool may include a generative tool to merge component images into a synthetic image (e.g., an image with a higher resolution). The component images may include a low-resolution image crop and a known similar image having a higher resolution. The known similar image may be retrieved from the database. The GAN tool may also include a discriminative tool to evaluate a synthetic detectability of the synthetic image (e.g., the resemblance of the synthetic image with a real image from the image database). For purposes of load balancing, multiple servers 130 can host memories including instructions to one or more processors, and multiple servers 130 can host a history log and the second image database.

Servers 130 may include any device having an appropriate processor, memory, and communications capability for hosting the generative tool, the discriminative tool, a GAN tool, and an image enhancement engine hosting the tools. The image enhancement engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the database on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
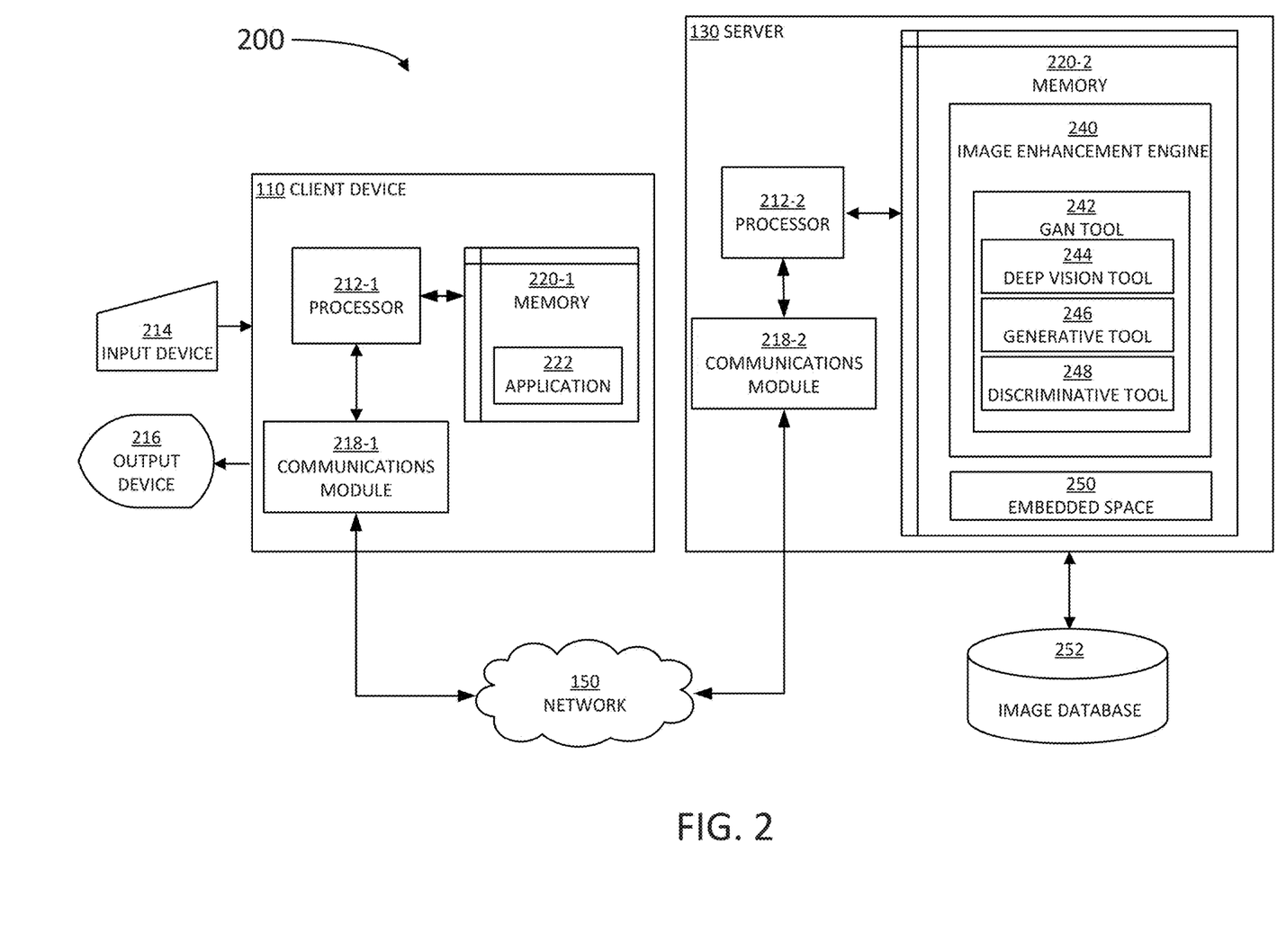
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device may be a screen display, a touchscreen, a speaker, and the like.

Server 130 includes a memory 220-2, a processor 212-2, and communications module 218-2. Processor 212-2 is configured to execute instructions, such as instructions physically coded into processor 212-2, instructions received from software in memory 220-2, or a combination of both. In some embodiments, memory 220-2 includes an image enhancement engine 240. Image enhancement engine 240 may include GAN tool 242. GAN tool 242 may include a deep vision tool 244, a generative tool 246, and a discriminative tool 248. Deep vision tool 244 may include a context embedder for associating images into an embedded vector space 250 based on context (e.g., a figure caption, textual reference, or semantic significance).

Embedded space 250 is a multi-dimensional vector space wherein each dimension corresponds to a style class or feature for an image. Accordingly, a vector projection over each dimension indicates, for a given image, a degree to which the image includes or represents said style class. A style class may be defined by an image caption, or some other textual description of a semantic concept that is useful to distinguish one image from another, or classify two images as visually similar. The quantification of the number and type of style classifications, and the projection of image vectors on each of the style classifications for any given image, may be performed by training a non-linear algorithm such as deep vision tool 244. The training of deep vision tool 244 is enhanced every time a user activates GAN tool 242. In that regard, deep vision tool 244 maps variable sized images in the image database into image vectors in the embedded space having a predetermined vector dimension. In some embodiments, deep vision tool 244 is trained to form an image vector in embedded space 250.

Generative tool 246 is configured to generate a plausible (e.g., 'realistic'), synthetic image given a compositional constraint (e.g., from a vector in embedded space 250) and a random seed. Discriminative tool 248 is configured to determine whether the synthetic image is real or not, and whether or not it matches the compositional constraint. In some embodiments, GAN tool 242 includes a recurrent tool that receives as input, from the user of client device 110, a sequence of image anchors as compositional constraints. In some embodiments, an image anchor is a box within a canvas having a location, a shape and a size, and a pre-selected content. The pre-selected content may include a specific image, a text query, or a full description of a desired theme within the box. More specifically, in some embodiments, at least one of GAN tool 242, deep vision tool 244, generative tool 246, or discriminative tool 248 include a neural network algorithm including multiple layers having nodes and coefficients associated to each node. The coefficients are determined based on a training set, wherein the gradients of the coefficients are weighted according to a desired outcome. Some embodiments include training discriminating tool 248 by applying the gradients to its coefficients based on losses (e.g., errors and failed assessments) resulting from real images with matching descriptions, from real images with invalid descriptions, and synthetic images (e.g., provided by generative tool 246). Accordingly, in some embodiments, discriminative tool 248 is configured to access image database 252 for training, and generative tool 246 is configured to provide synthetic images to image database 252.

The user may access GAN tool 242 through an application 222 or a web browser installed in memory 220-1. Accordingly, application 222 may be installed by server 130 and perform scripts and other routines provided by server 130. Execution of application 222 may be controlled by a processor 212-1 in client device 110. In some embodiments, GAN tool 242, the tools contained therein, and at least part of image database 252 may be hosted in a different server that is accessible by server 130.

Figure 3:
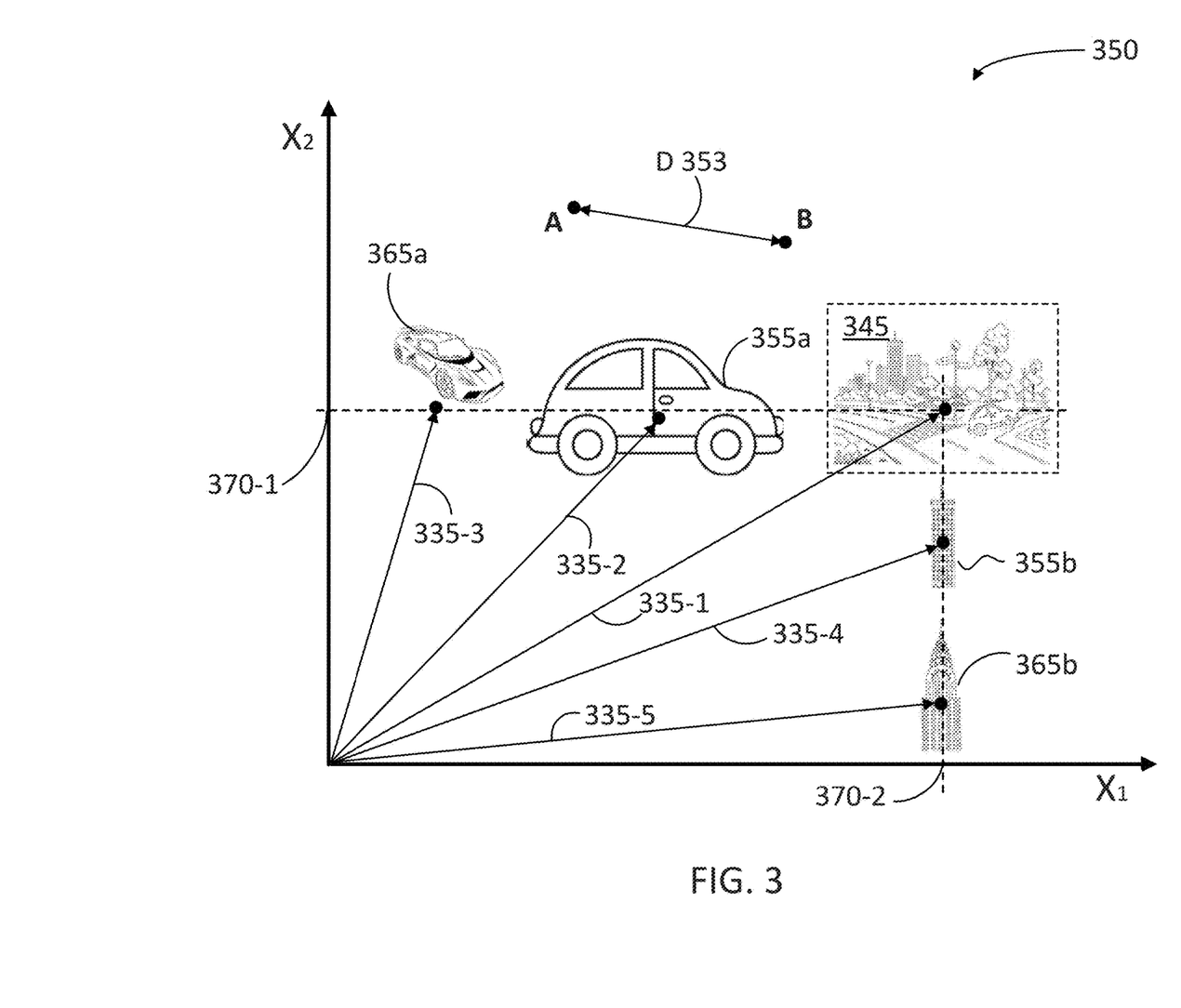
FIG. 3 illustrates an embedded space with image vectors for enhancing resolution in cropped image portions, according to some embodiments.

FIG. 3 illustrates an embedded space 350 with image vectors 335-1, 335-2, 335-3, 335-4, and 335-5 (hereinafter, collectively referred to as "image vectors 335"), according to some embodiments. In some embodiments, each image vector 335 may be associated with an image in a database (e.g., image database 252). Conversely, in some embodiments, each image stored in the database may have an associated image vector 335 in embedded space 350. A measure of distance between any two vectors A and B (e.g., vectors 335) may be defined as a "cosine" distance, D 353. In some embodiments, and without limitation, a cosine distance between two vectors, A and B, regardless of the dimensions of the vectors, may be obtained from the mathematical expression $$D = 1 - \frac{A \cdot B}{|A||B|}, \quad (1)$$

where the "dot" product "□" may be suitably defined for the vector space that includes vectors A and B, and |A| and |B|, are generally "lengths" associated to vectors A and B, respectively, in the vector space. The lengths of vectors A and B may be defined in terms of coordinates $X_1(x)$ and $X_2(y)$ in different ways. For example, in some embodiments, the length of vectors A and B may be defined as:

$$|A| = \sqrt{x_A^2 + y_A^2} \quad (2.1)$$

$$|B| = \sqrt{x_B^2 + y_B^2} \quad (2.2)$$

And the dot product A⊕B may be defined as $$A \cdot B = x_A \cdot x_B + y_A \cdot Y_B \quad (2.3)$$

Image vectors 335 are associated, respectively, to source image 345, image portion 355a, known similar image 365a, image portion 355b, and known similar image 365b. Without limitation, and for illustrative purposes only, source image 345 may include a city landscape. Image portion 355a may include an image of a car cropped from source image 345. Known similar image 365a may be a generic automobile in the database. In some embodiments, known similar image 365a is a high-resolution image of the same or similar car depicted in image portion 355a. Likewise, image portion 355b may include an image of a skyscraper cropped from a different portion in source image 345. Accordingly, known similar image 365b may be a generic skyscraper in the database.

Image portions 355a and 355b (hereinafter, collectively referred to as "image portions 355") may be automatically selected by image enhancement engine 240. Accordingly, in an effort to increase and enhance the quality of image database 252, image enhancement engine 240 may select different cropped portions of source image 345, and build enhanced versions of the cropped portions. In some embodiments, image enhancement engine 240 may store the enhanced versions of the cropped portions in image database 252 as separate images, as a resource for further searches. In some embodiments, image portions 355 may be selected by a user through application 222 in client device 110. The user may be interested in enhancing certain detail within source image 345 to extract more information, or even to create an improved version of source image 345.

For illustrative purposes, only the projection of embedded space 350 on two dimensions, $X_1$, in the abscissae and $X_2$, in the ordinates, are illustrated. In some embodiments, embedded space 350 may include tens, hundreds, or even thousands of dimensions. In some embodiments, known similar image 365a may be selected from an image database. Accordingly, in some embodiments, generative tool 246 is used in combination with discriminative tool 248 (e.g., as configured in GAN tool 242) to enhance image portion 355a, based on features in known similar image 365a.

Embedded space 350 may be formed by deep vision tool 244 using image database 252. Further, embedded space 350 may be stored in a server memory (e.g., embedded space 250 in memory 220-2), or may be external to the memory and directly or remotely accessible to GAN tool 242 (e.g., image database 252). The values for the coordinates along the $X_1$ and $X_2$ axes, for each of image vectors 335, may be determined by deep vision tool 244. The projections of image vectors 335 onto axes $X_1$ and $X_2$ indicate a degree to which images 345 include or represent a given feature in a classification space. For example, and without limitation, axis $X_2$ (ordinates) may indicate a degree of "car-like" features in an image. Accordingly, projection 370-1 of image vectors 335-1, 335-2, and 335-3 onto axis $X_2$ are expected to be similar (e.g., a "car-like" value on coordinate $X_2$). More specifically, it is expected that a projection 370-2 of the cityscape in source image 345 on "car-like" axis $X_2$ be the same, or almost the same, as the projection of image portion 355a and of known similar image 365a onto axis $X_2$. Likewise, axis $X_1$ (abscissae) may indicate a degree of "skyscraper-like" features in an image. Accordingly, projection 370-2 of image vectors 335-1, 335-4, and 335-5 onto axis $X_1$ are expected to be similar. More specifically, it is expected that a projection 370-2 of the cityscape in source image 345 on "skyscraper-like" axis $X_1$ be the same, or almost the same, as the projection of image portion 355b and of known similar image 365b onto axis $X_1$.

The system may encounter multiple similar images 365a to match image portion 355a using the cosine distance (cf. Eq. 1 using coordinates $X_1$ and $X_2$) to look for the closest images in embedded space 350. Based on the value or quality of each of similar images 365a, the system may predict the performance of image portion 355a. Likewise, the performance of image portion 355b may be determined by the value or quality of each of similar images 365b selected by their proximity to image portion 355b. In some embodiments, the system may compare the performance of image portion 355a to that of image portion 355b to determine which of the cropped images to use for enhancing the image database. Further, in some embodiments, the system may adjust the cropping parameters (e.g., increase/decrease, horizontal/vertical boundaries) to either (or both) image portions 355 to increase, maximize, or optimize, the performance (based on the performance of the similar images selected thereafter). Moreover, in some embodiments the system may combine image portions 355 into a single image (e.g., extend the crop boundaries to include both the skyscraper and the car), based on an increased performance of the resulting crop.

Figure 4:
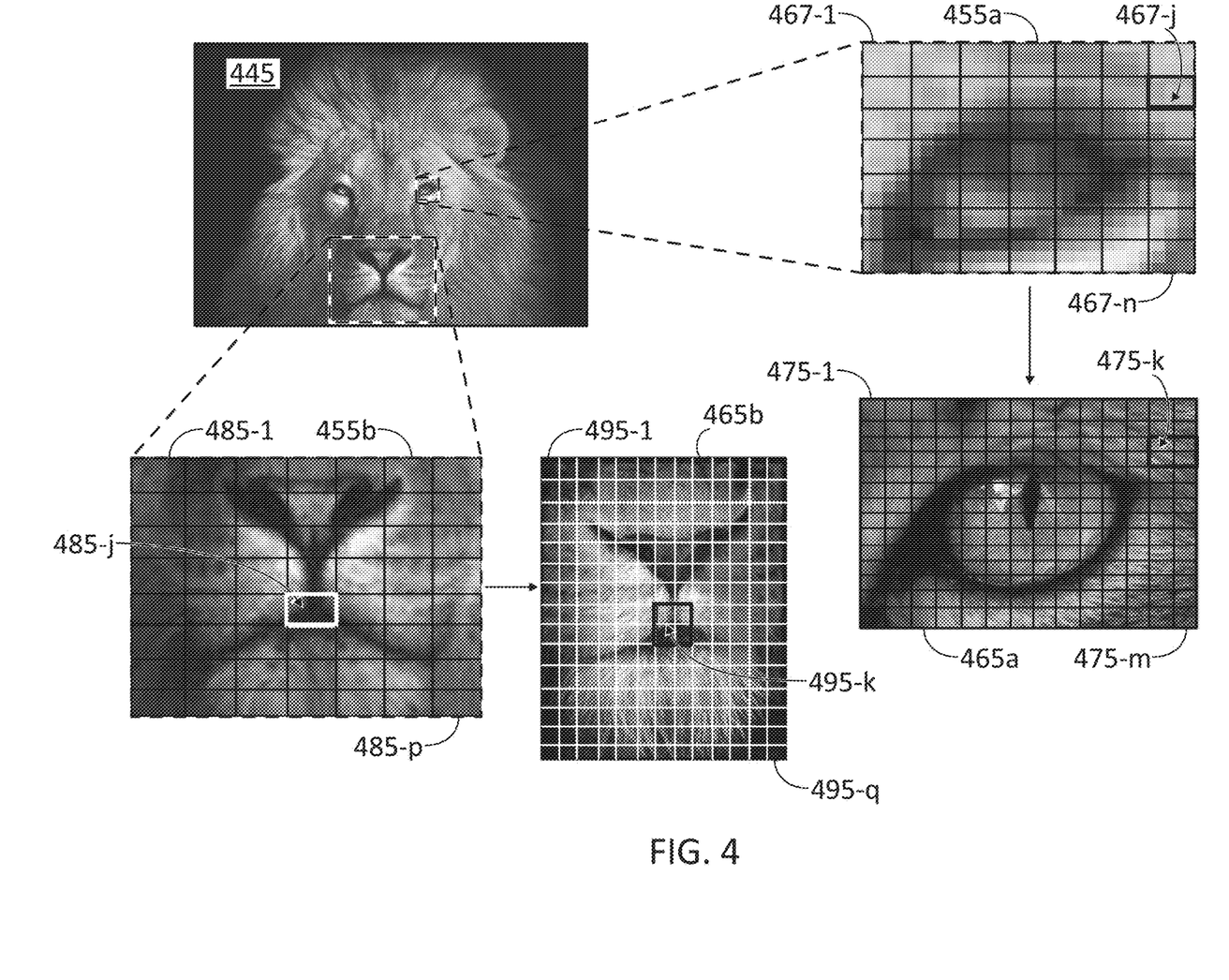
FIG. 4 illustrates image portions cropped from a homogenous source image to obtain enhanced image portions, according to some embodiments.

FIG. 4 illustrates image portions 455a and 455b (collectively referred to, hereinafter, as "image portions 455") cropped from a homogeneous source image 445 to obtain enhanced image portions, according to some embodiments. Image portions 455 may be selected out of different crops in source image 445. Source image 445 is homogenous in the sense that it contains a single item that can be simply described with a caption such as "Lion's Head." Image portion 455a may be the "Lion's eye," and image portion 455b may be the "Lion's mouth." In some embodiments, image portions 455 may be automatically selected by an application running in the client device, or by code stored in a server memory (e.g., application 222 or image enhancement engine 240 and tools thereof). For example, in some embodiments, an application or image enhancement engine may be configured to expand, or augment, the image stock in a database (e.g., image database 252), with an enhanced version (e.g., a "zoom in" or a "close up") of the Lion's eye or mouth. In some embodiments, the selection of image portions 455 may be provided by a user (e.g., via client device 110), simply by clicking and selecting with a pointer (e.g., a mouse, a stylus, or finger, as in input device 214) on source image 445.

In some embodiments, image enhancement engine 240 may use multiple image portions 455 to select the best-enhanced image portion(s) result. In some embodiments, image enhancement engine 240 may test multiple image portions 455 and select one that has a reduced computational cost for image enhancement. Accordingly, image enhancement engine 240 compares image portions 455 with known similar images 465a and 465b (hereinafter, collectively referred to as known similar images 465) to determine a score for predicting the enhanced performance on each of the image portions 455. The performance of each of the image portions 455 may include a quality value intrinsic to the image portion, or a value of the resulting image in the "image marketplace" (e.g., the number of expected downloads of the resulting image based on the downloads and other value parameters of similar images 465). In some embodiments, image enhancement engine 240 may scale the pixel resolution of image portions 455 according to the pixel resolution of known similar images 465. For example, image portion 455a may include n pixels 467-1 through 467-n (hereinafter, collectively referred to as "pixels 467"), including a pixel 467-j (j<n, n being any integer). Known similar image 465a may include pixels 475-1 through 475-m, where m is an integer greater, or much greater, than n. Accordingly, a pixel 467-j in image portion 455a may be split into two or more pixels 475-k in known similar image 465a. Likewise, image portion 455b may include n pixels 485-1 through 485-p (hereinafter, collectively referred to as "pixels 485"), including a pixel 485-j (j<n, n being any integer). Known similar image 465b may include pixels 495-1 through 495-q (hereinafter, collectively referred to as "pixels 495"), where q is an integer greater, or much greater, than p. Accordingly, a pixel 485-$j$ in image portion 455$b$ may be split into two or more pixels 485-$k$ in known similar image 465$b$. More generally, any image portion 455 can be scaled to multiple different image resolutions to obtain a desired enhancement performance at a limited computational cost.

In some embodiments, image enhancement engine splits pixels 467-$j$ and 485-$j$ into multiple pixels 475-$k$ and 495-$k$ respectively, to produce enhanced image portions where each of the pixels 475-$k$ (or 485-$k$) has a specific value selected to enhance the quality of image portions 455. To achieve this, image enhancement engine 240 may use GAN tool 242 and the pixel values in known similar images 465. For example, generative tool 246 may use pixels 467 as input to generate pixels 475 as output, while discriminative tool 248 tests the synthetic appearance of the results (e.g., a synthetic value of the enhanced image portion is below a tolerance value). In some embodiments, instead of using pixels 475 as a desired output, GAN tool 242 may select other quality metrics in a performance feedback loop. In the performance feedback loop, the pixel values are adjusted until a performance error is below a tolerance value. In some embodiments, the performance error may include a proximity to a high quality image in the embedded space, and a market value or other quality indicator of the high quality image. In some embodiments, the performance error may be an intrinsic property of the image, such as sharpness, contrast, blur, chromaticity (e.g., color matching, and the like).

In some embodiments, image enhancement engine 240 may adjust the resolution scale (e.g., increase or decrease the number of pixels of the enhanced image portion) to achieve faster convergence of the feedback loop. In some embodiments, image enhancement engine 240 may also alter the number and type of input pixels for image portions 455. For example, in some embodiments, image enhancement engine 240 may change the crop of source image 445 (adding more horizontal pixels, or more vertical pixels, or re-centering the image portion over the source image) to improve image enhancement performance. The image enhancement performance may be determined by a quality value, by a computational cost, or a combination of both. Image enhancement engine 240 may store or modify one or more test coefficients in GAN tool 242, deep vision tool 244, generative tool 246, and discriminative tool 248, based on past performance for multiple source images 445 in a training set.

Figure 5:
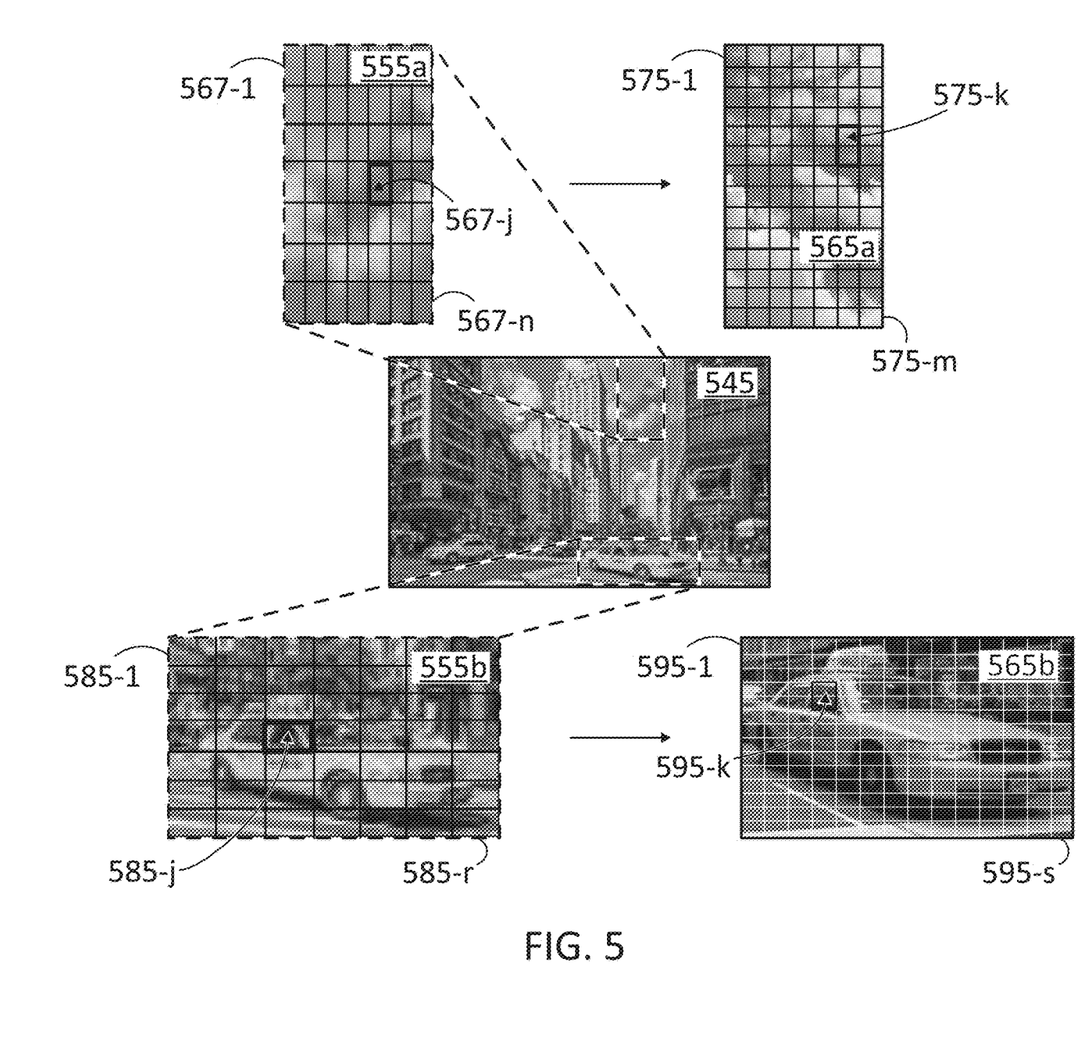
FIG. 5 illustrates image portions cropped from a heterogeneous source image to obtain enhanced image portions, according to some embodiments.

FIG. 5 illustrates image portions 555$a$ and 555$b$ (hereinafter, collectively referred to as "image portions 555") cropped from a heterogeneous source image 545 to obtain enhanced image portions, according to some embodiments. Image portions 555 may be selected out of different crops in source image 545. Source image 545 is heterogeneous in the sense that it contains multiple disparate items that make a multi-faceted thematic composition (a "cityscape"). Image portion 555$a$ may be a cloud in a blue sky background, and image portion 555$b$ may be a taxi cab turning a corner. In some embodiments, image portions 555 may be automatically selected by an application running in the client device, or by code stored in a server memory (e.g., application 222 or image enhancement engine 240 and tools thereof). For example, in some embodiments, an application or image enhancement engine may be configured to expand, or augment, the image stock in a database (e.g., image database 252) with an enhanced version (e.g., a "zoom in" or a "close up") of the city sky, or of the taxi cab turning the corner. In some embodiments, the selection of image portions 555 may be provided by a user (e.g., via client device 110) simply by clicking and selecting with a pointer (e.g., a mouse, a stylus, or finger, as in input device 214) on source image 545. For example, in some embodiments, a user may desire to obtain information such as the identity of the cab driver, the cab plates, and the like.

In some embodiments, image enhancement engine 240 may use multiple image portions 555 to select the best-enhanced image portion result. In some embodiments, image enhancement engine 240 may test multiple image portions 555 and may leverage a reduced computational cost with a higher value of the resulting image in the image marketplace. Accordingly, image enhancement engine 240 compares image portions 555 with known similar images 565$a$ and 565$b$ (hereinafter, collectively referred to as known similar images 565) to determine a score for predicting the enhanced performance on each of the image portions 555. In some embodiments, image enhancement engine 240 may scale the pixel resolution of image portions 555 according to the pixel resolution of known similar images 565. For example, image portion 555$a$ may include n pixels 567-1 through 565-$n$ (hereinafter, collectively referred to as "pixels 567"), including a pixel 567-$j$ (j<n, n being any integer). Known similar image 565$a$ may include pixels 575-1 through 575-$m$, where m is an integer greater, or much greater, than n. Accordingly, a pixel 567-$j$ in image portion 555$a$ may be split into two or more pixels 575-$k$ in known similar image 565$a$. Likewise, image portion 555$b$ may include n pixels 585-1 through 585-$r$ (hereinafter, collectively referred to as "pixels 585"), including a pixel 585-$j$ (j<n, n being any integer). Known similar image 565$b$ may include pixels 595-1 through 595-$s$ (hereinafter, collectively referred to as "pixels 595"), where s is an integer greater, or much greater, than r. Accordingly, a pixel 585-$j$ in image portion 555$b$ may be split into two or more pixels 595-$k$ in known similar image 565$b$. More generally, any image portion 555 can be scaled to multiple different image resolutions, to obtain a desired image enhancement at a limited computational cost.

In some embodiments, image enhancement engine splits pixels 567-$j$ and 585-$j$ into multiple pixels 575-$k$ and 595-$k$ respectively, to produce enhanced image portions where each of the pixels 575-$k$ (or 585-$k$) has a specific value selected to enhance the quality of image portions 555. To achieve this, image enhancement engine 240 may use GAN tool 242 and the pixel values in known similar images 565. For example, generative tool 246 may use pixels 567 as input to generate pixels 575 as output, while discriminative tool 248 tests the synthetic appearance of the results (e.g., a synthetic value of the enhanced image portion is below a tolerance value). In some embodiments, instead of using pixels 575 as a desired output, GAN tool 242 may select other quality metrics in a performance feedback loop. In the performance feedback loop, the pixel values are adjusted until a performance error (as defined above) is below a tolerance value.

In some embodiments, image enhancement engine 240 may adjust the resolution scale (e.g., increase or decrease the number of pixels of the enhanced image portion) to achieve faster convergence of the feedback loop. In some embodiments, image enhancement engine 240 may also alter the number and type of input pixels for image portions 555. For example, in some embodiments, image enhancement engine 240 may change the crop of source image 545 (adding more horizontal pixels, or more vertical pixels, or re-centering the image portion over the source image) to improve image enhancement performance. The image enhancement performance may be determined by a quality value, by a computational cost, or a combination of both. Image enhancement engine 240 may store or modify one or more test coefficients in GAN tool 242, deep vision tool 244, generative tool 246, and discriminative tool 248, based on past performance for multiple source images 545 in a training set.

Figure 6:
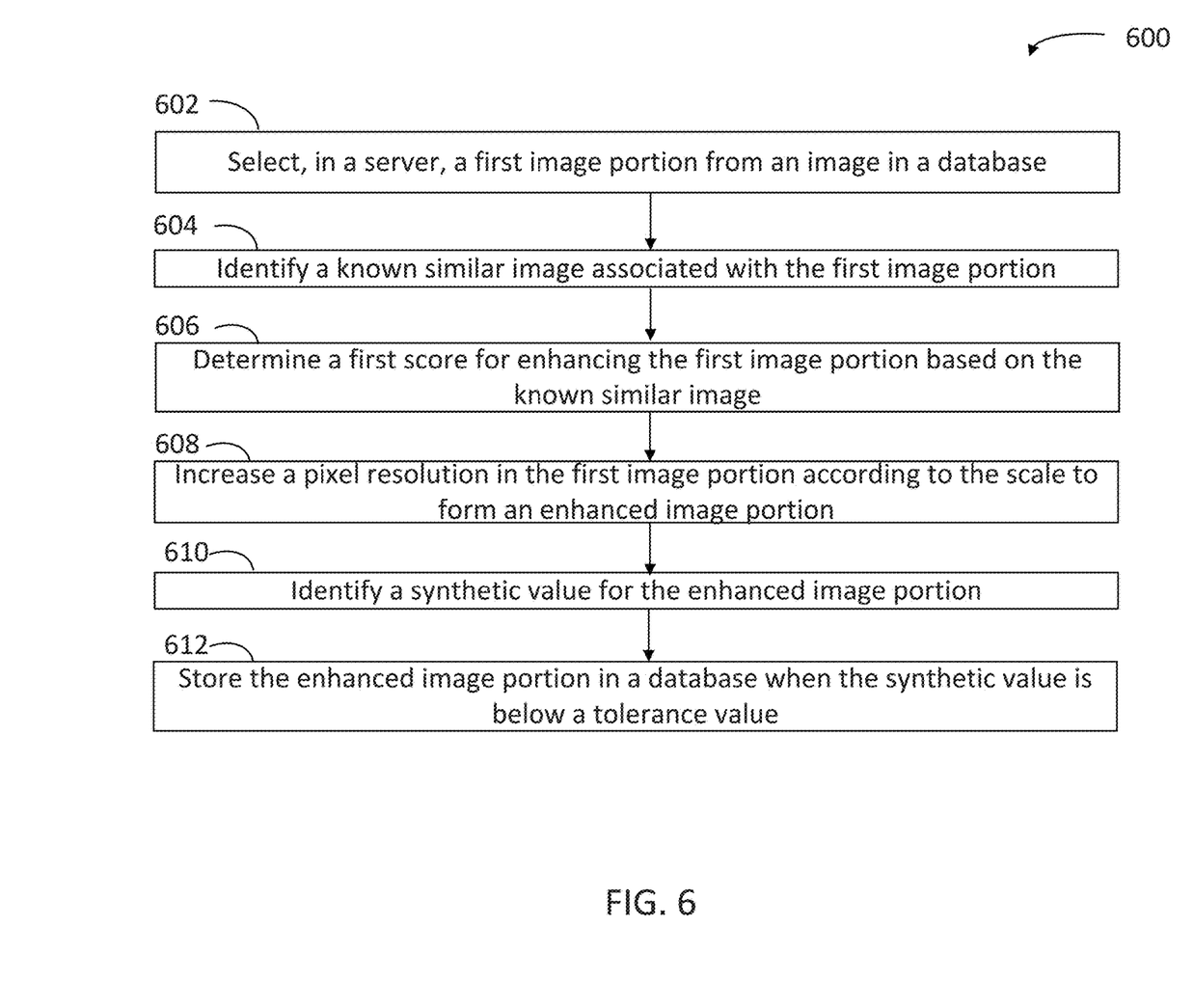
FIG. 6 is a flow chart illustrating steps in a method for selecting an image portion from a source image to generate an enhanced image portion, according to some embodiments.

FIG. 6 is a flow chart illustrating steps in a method 600 for selecting an image portion from a source image to generate an enhanced image portion, according to some embodiments. Method 600 may be performed at least partially by any one of multiple network servers hosting a collection of images, videos, and multimedia files (e.g., images and video clips), while communicating with any one of a plurality of client devices through a network (e.g., any one of servers 130 and any one of client devices 110 in network 150). The client devices may be handled by a user, wherein the user may be registered to a private account with the server, or may be a visitor to the server website or logged in a server application (e.g., application 222). At least some of the steps in method 600 may be performed by a computer having a processor executing commands stored in a memory of the computer (e.g., processors 212 and memories 220). Further, steps as disclosed in method 600 may include retrieving, editing, and/or storing files in an image database that is part of, or is communicably coupled to, the computer, using, inter-alia, an image enhancement engine hosting a GAN tool (e.g., database 252, image enhancement engine 240, and GAN tool 242). The GAN tool may include a deep vision tool to embed images into an embedded space, a generative tool to form synthetic images from merged vectors, and a discriminative tool to determine how realistic a synthetic image is (e.g., deep vision tool 244, generative tool 246, discriminative tool 248, and embedded spaces 250 and 350). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes selecting, in a server, a first image portion from an image in a database. In some embodiments, step 602 includes receiving the image from a user via a client device communicatively coupled to the server. In some embodiments, step 602 includes retrieving the image from the database upon a user request.

Step 604 includes identifying a known similar image(s) associated with the first image portion. In some embodiments, step 604 may include identifying an ensemble (e.g., more than one) of similar images to allow for a better estimation of performance. In some embodiments, step 604 includes parsing the image according to a salient feature in a classification space, and verifying that the enhanced image portion contains the salient feature. In some embodiments, step 604 includes selecting a second image portion from the image, determining a second score for enhancing the second image portion based on a second similar image from the database, and forming a second enhanced image portion based on the second image portion when the second score is greater than the first score. In some embodiments, step 604 includes receiving the known similar image from a user via a client device communicatively coupled to the server. In some embodiments, step 604 includes searching a database for an image similar to the first image portion.

Step 606 includes determining a first score for enhancing the first image portion based on the known similar image. In some embodiments, step 606 may include determining the first score based on the performance of the known similar image in the image market place (e.g., number of downloads, or clicks, by other users). In some embodiments, step 606 includes adjusting a scale for the first image portion according to an aspect ratio of the known similar image when comparing the first image portion and the known similar image. In some embodiments, step 606 includes using a generative adversarial network to increase a pixel resolution and obtain an enhanced image portion that resembles the known similar image and has a synthetic value below the tolerance value.

Step 608 includes increasing a pixel resolution in the first image portion according to the scale to form an enhanced image portion. In some embodiments, step 608 includes increasing a number of pixel rows or a number of pixel columns according to the aspect ratio of the known similar image in the enhanced image portion, and selecting a new pixel value to enhance a salient feature of the image in a classification space. In some embodiments, step 608 includes splitting at least one pixel in the first image portion into two or more enhanced pixels, each of the enhanced pixels having a different pixel value based on a salient feature of the image in a classification space.

Step 610 includes identifying a synthetic value for the enhanced image portion. In some embodiments, step 610 includes replacing the first image portion with the enhanced image portion in the image to form a new image, and determining a similarity between the image and the new image. Further, in some embodiments, step 610 may include determining a difference in the probability that the original image will be downloaded or selected by a user with the probability that the new image be downloaded or selected by the user. In some embodiments, step 610 may include predicting a marketplace performance of the enhanced image portion. For example, in some embodiments step 610 may include using image selection, downloads, average order value ($) as marketplace performance parameters.

Step 612 includes storing the enhanced image portion in a database when the synthetic value is below a tolerance value. In some embodiments, step 612 includes modifying a crop factor in the first image portion when the first score is less than a pre-selected threshold. For example, in some embodiments step 612 may include increasing/decreasing a horizontal/vertical dimension of a window crop to obtain a new image portion.

Figure 7:
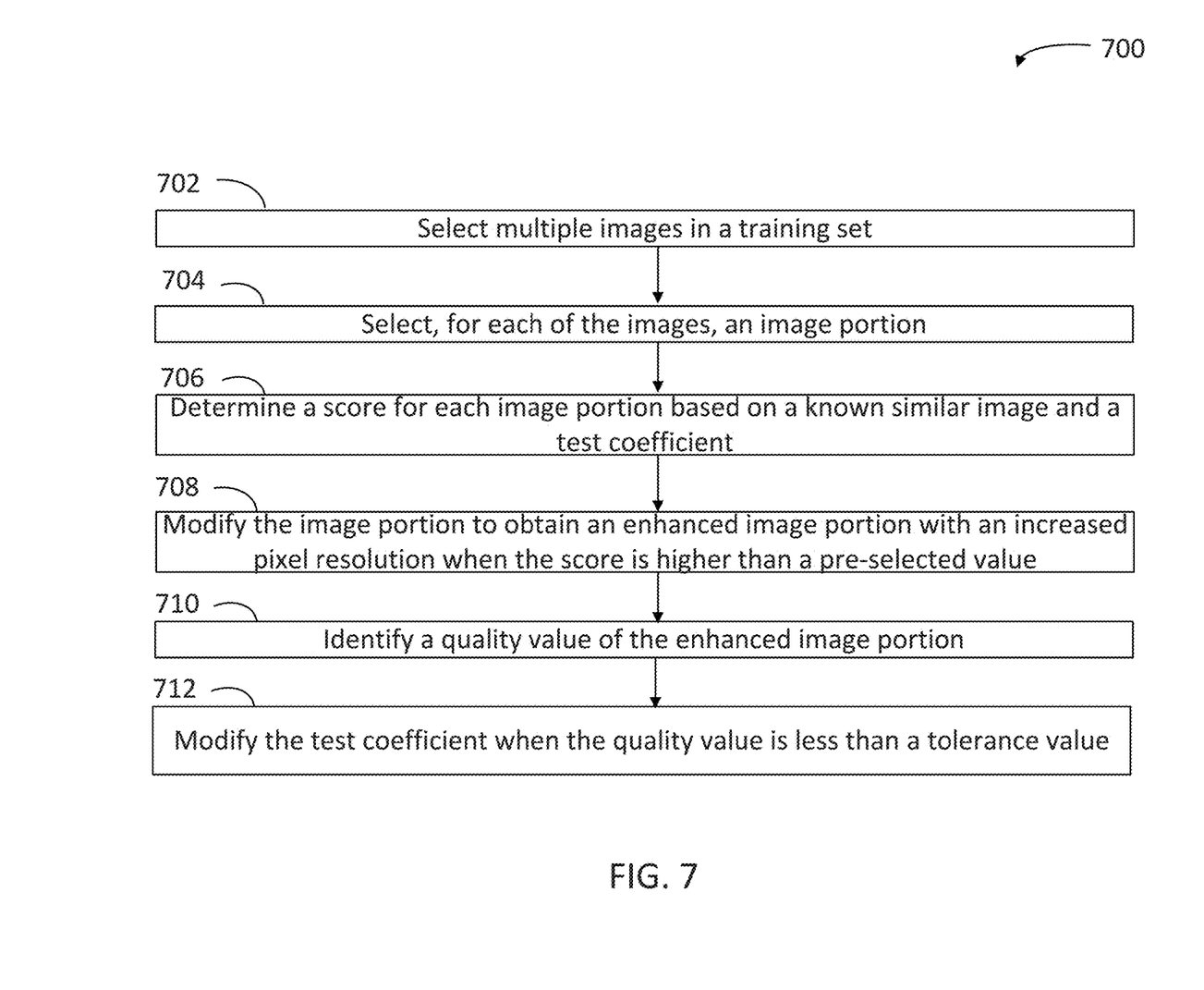
FIG. 7 is a flow chart illustrating steps in a method for training a tool for automatic identification of image crops to generate new images, according to some embodiments.

FIG. 7 is a flow chart illustrating steps in a method 700 for training a tool for automatic identification of image crops to generate new images, according to some embodiments. Method 700 may be performed at least partially by any one of multiple network servers hosting a collection of images, videos, and multimedia files (e.g., images and video clips), while communicating with any one of a plurality of client devices through a network (e.g., any one of servers 130 and any one of client devices 110 in network 150). The client devices may be handled by a user, wherein the user may be registered to a private account with the server, or may be a visitor to the server website or logged in a server application (e.g., application 222). At least some of the steps in method 700 may be performed by a computer having a processor executing commands stored in a memory of the computer (e.g., processors 212 and memories 220). Further, steps as disclosed in method 700 may include retrieving, editing, and/or storing files in an image database that is part of, or is communicably coupled to, the computer, using, inter-alia, an image enhancement engine hosting a GAN tool (e.g., database 252, image enhancement engine 240, and GAN tool 242). The GAN tool may include a deep vision tool to embed images into an embedded space, a generative tool to form synthetic images from merged vectors, and a discriminative tool to determine how realistic a synthetic image is (e.g., deep vision tool 244, generative tool 246, discriminative tool 248, and embedded spaces 250 and 350). Further, in some embodiments, method 700 includes selecting and storing commands and instructions in the server memory, the commands being part of the image enhancement engine, the GAN tool, or any of the components thereof. Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes selecting multiple images in a training set.

In some embodiments, step 702 includes forming at least one composite image in the training set using a generative adversarial tool and multiple source images.

Step 704 includes selecting, for each of the images, an image portion.

Step 706 includes determining a score for each image portion based on a known similar image and a test coefficient. The test coefficient may be a parameter in a non-linear function for a node in a neural network algorithm for the generative tool or the discriminative tool. In some embodiments, step 706 may further include modifying the test coefficient when the enhanced image portion is different from the source images. In some embodiments, step 706 includes modifying the test coefficient when a discriminative tool determines that a synthetic value of the enhanced image portion is larger than the tolerance value. In some embodiments, step 706 includes configuring a generative tool to transform the image portion into the known similar image style.

Step 708 includes modifying the image portion to obtain an enhanced image portion with an increased pixel resolution when the score is higher than a pre-selected value. In some embodiments, step 708 includes modifying a test coefficient in a discriminative tool to obtain an enhanced image portion with an increased pixel resolution.

Step 710 includes identifying a quality value of the enhanced image portion. In some embodiments, step 710 includes selecting a probability that a user will download the enhanced image portion as a quality value based on a predicted performance of the enhanced image in the "marketplace". In some embodiments, step 710 includes selecting the quality value by replacing the image portion with the enhanced image portion for each of the images to obtain enhanced images, and comparing the enhanced images with each of the images. In some embodiments, the quality value of the enhanced image portion is a predicted marketplace value of the enhanced image portion (e.g., number of downloads, clicks, purchases and the like). In some embodiments, step 710 may include determining the quality value based on the marketplace value of the one or more similar images. Further, in some embodiments, step 710 may include selecting the quality value as a difference in the probability that the original image will be downloaded or selected by a user with the probability that the new image, including the enhanced image portion, be downloaded or selected by the user.

Step 712 includes modifying the test coefficient when the quality value is less than a tolerance value.

Hardware Overview

Figure 8:
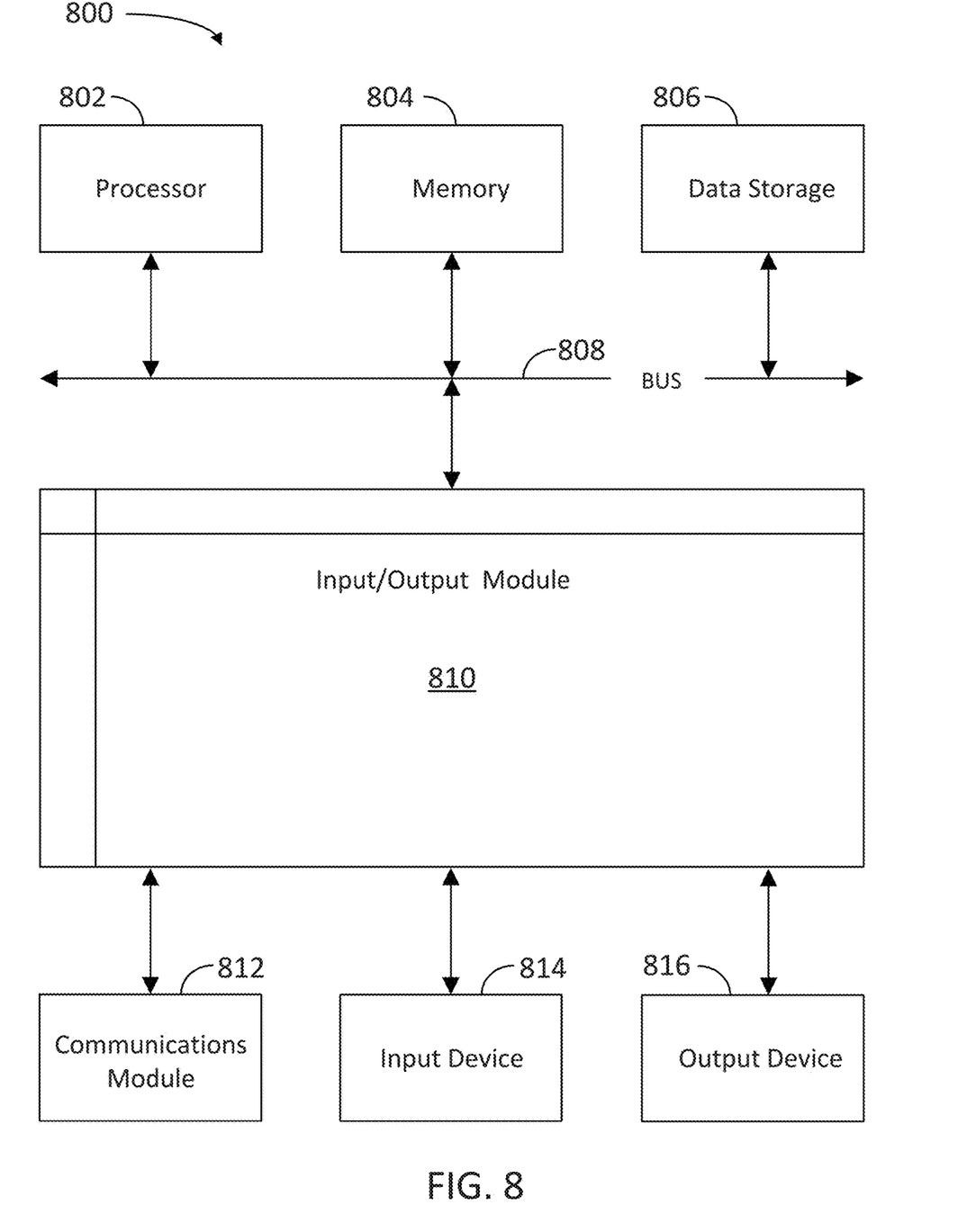
FIG. 8 is a block diagram illustrating an example computer system with which the client and server of FIGS. 1 and 2, and the methods of FIGS. 6-7 can be implemented.

FIG. 8 is a block diagram illustrating an exemplary computer system 800 with which the client 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, the feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    selecting, in a server, a first image portion from an image;
    identifying one or more known similar images associated with the first image portion;
    determining a first score for enhancing the first image portion based on the one or more known similar images;
    increasing a pixel resolution in the first image portion according to a scale to form an enhanced image portion;
    identifying a synthetic value for the enhanced image portion; and
    storing the enhanced image portion in a database when the synthetic value is below a tolerance value.

2. The computer-implemented method of claim 1, further comprising receiving the image from a user via a client device communicatively coupled to the server.

3. The computer-implemented method of claim 1, further comprising retrieving the image from the database upon a user request.

4. The computer-implemented method of claim 1, wherein selecting the first image portion from the image comprises parsing the image according to a salient feature in a classification space, and verifying that the enhanced image portion contains the salient feature.

5. The computer-implemented method of claim 1, further comprising selecting a second image portion from the image, determining a second score for enhancing the second image portion based on a second similar image from the database, and forming a second enhanced image portion based on the second image portion when the second score is greater than the first score.

6. The computer-implemented method of claim 1, wherein identifying the one or more known similar images comprises receiving the one or more known similar images from a user via a client device communicatively coupled to the server.

7. The computer-implemented method of claim 1, further comprising adjusting the scale for the first image portion using a Generative Adversarial Network (GAN) to increase a pixel resolution and obtain the enhanced image portion that resembles the one or more known similar images and has the synthetic value below the tolerance value.

8. The computer-implemented method of claim 1, wherein increasing a pixel resolution in the first image portion comprises:
    increasing a number of pixel rows or a number of pixel columns according to an aspect ratio of the one or more known similar images in the enhanced image portion, and
    selecting a new pixel value to enhance a salient feature of the image in a classification space.

9. The computer-implemented method of claim 1, wherein increasing a pixel resolution in the first image portion comprises splitting at least one pixel in the first image portion into two or more enhanced pixels, each of the enhanced pixels having a different pixel value based on a salient feature of the image in a classification space.

10. The computer-implemented method of claim 1, further comprising modifying a crop factor in the first image portion when the first score is less than a pre-selected threshold.

11. A system comprising:
    one or more processors; and
    a memory coupled to the one or more processors, the memory including instructions that, when executed by the one or more processors, cause the one or more processors to:
    select, in a server, a first image portion from an image;

identify one or more known similar images to the first image portion;

determine a first score for enhancing the first image portion based on the one or more known similar images;

increase a pixel resolution in the first image portion according to a scale to form an enhanced image portion;

identify a synthetic value for the enhanced image portion; and store the enhanced image portion in a database when the synthetic value is below a tolerance value.

12. The system of claim 11, wherein the one or more processors further execute the instructions to select a second image portion from the image to determine a second score for enhancing the second image portion based on a second similar image from the database, and to form a second enhanced image portion based on the second image portion when the second score is greater than the first score.

13. The system of claim 11, wherein to select the first image portion from the image the one or more processors execute the instructions to parse the image according to a salient feature in a classification space, and to verify that the enhanced image portion contains the salient feature.

14. The system of claim 11, wherein to identify the one or more known similar images the one or more processors receive the one or more known similar images from a user via a client device communicatively coupled to the server.

\* \* \* \* \*